United States Patent Office 3,480,620
Patented Nov. 25, 1969

3,480,620
1,2-EPOXY-STEROIDS
Andor Furst, Basel, and Marcel Muller, Frenkendorf, Switzerland, assignors to Hoffmann-La Roche Inc., Nutley, N.J., a corporation of New Jersey
No Drawing. Filed July 14, 1966, Ser. No. 565,093
Claims priority, application Switzerland, July 19, 1965, 10,075/65
Int. Cl. C07c *173/00, 169/66, 167/26*
U.S. Cl. 260—239.55
9 Claims

ABSTRACT OF THE DISCLOSURE

Compounds of the formula

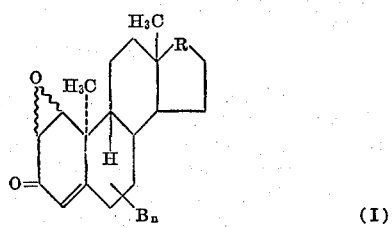

wherein B is an additional unsaturation between the carbon atoms in the 6- or 7-position and $n$ is a whole integer from 0 to 1; R is

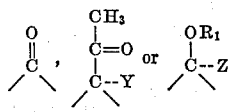

$R_1$ is hydrogen or a substituent containing from 1 to 10 carbon atoms selected from the group consisting of alkyl, alkanoyl, ar-alkanoyl or aroyl; Y is hydrogen, hydroxy or a substituent containing from 1 to 10 carbon atoms selected from the group consisting of alkoxy, alkanoyloxy, ar-alkanoyloxy and aroyloxy; and Z is hydrogen, lower alkyl, lower alkenyl or lower alkynyl.

1,2-epoxy steroids of the aforementioned series of Formula I above are intermediates which can be converted to pharmaceutically useful C–1 and C–2 substituted $9\beta,10\alpha$-steroids.

This invention relates to novel A-ring substituted steroids, as well as methods of preparing them. More particularly, this invention relates to 1,2-epoxy-steroids and a selective oxidation method for their preparation. The compounds of this invention, which are useful as chemical intermediates, are of the formula

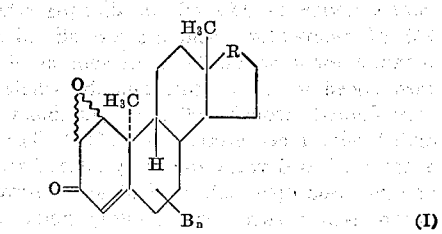

wherein B is an additional unsaturation between the carbon atoms in the 6- and 7-position and $n$ is a whole integer from 0 to 1; R is

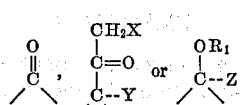

$R_1$ is hydrogen or a substituent containing from 1 to 10 carbon atoms selected from the group consisting of alkyl, alkanoyl, ar-alkanoyl or aroyl; X is hydrogen, halogen, hydroxy or a substituent containing from 1 to 10 carbon atoms selected from the group consisting of alkanoyloxy, ar-alkanoyloxy or aroyloxy; Y is hydrogen, hydroxy or a substituent containing from 1 to 10 carbon atoms selected from the group consisting of alkoxy, alkanoyloxy, ar-alkanoyloxy and aroyloxy; and Z is hydrogen, lower alkyl, lower alkenyl or lower alkynyl.

As used above alkyl denotes saturated straight or branched chain hydrocarbon groups, such as methyl, ethyl, t-butyl or the like. The term alkanoyl includes moieties from alkane carboxylic acids such as formic acid, acetic acid, propionic acid, butyric acid, caproic acid, enanthic acid, capric acid, or the like. The term ar-alkanoyl includes groups containing an aryl moiety attached to a moiety from an alkane carboxylic acid. The aryl moiety is preferably phenyl. Thus, the term ar-alkanoyl refers to groups such as phenyl-acetyl and the like. The term aroyl refers to groups such as benzoyl and the like. The term halogen as a meaning of X signifies all four halogens, i.e., fluorine, chlorine, bromine or iodine, fluorine being especially preferred. The term lower alkyl refers to saturated straight or branched chain hydrocarbon groups preferably having from 1 to 6 carbon atoms such as methyl, ethyl or the like. Similarly, the term lower alkenyl refers to olefinically unsaturated straight or branched chain hydrocarbon groups preferably having up to 6 carbon atoms such as vinyl, allyl, 2'-methallyl, 1'-methallyl or the like. The term lower alkynyl refers to acetylenically unsaturated straight or branched chain hydrocarbon groups preferably having up to 6 carbon atoms such as ethynyl, propynyl, butadiynyl or the like.

Exemplary compounds of this invention of Formula I above are:

(1) $1\alpha,2\alpha$-epoxy-$9\beta,10\alpha$-pregna-4,6 diene-3,20-dione,
(2) $1\alpha,2\alpha$-epoxy-$9\beta,10\alpha$-pregn-4-ene-3,20-dione,
(3) $1\beta,2\beta$-epoxy-$17\beta$-hydroxy-$9\beta,10\alpha$-androst-4-en-3-one,
(4) $1\beta,2\beta$-epoxy-$17\alpha$-methyl-$17\beta$-hydroxy-$9\beta,10\alpha$-androst-4-en-3-one,
(5) $1\beta,2\beta$-epoxy-$17\alpha$-hydroxy-$9\beta,10\alpha$-pregna-4,6-diene-3,20-dione,
(6) $1\beta,2\beta$-epoxy-$17\alpha$-acetoxy-$9\beta,10\alpha$-pregna-4,6-diene-3,20-dione,
(7) $1\beta,2\beta$-epoxy-$17\alpha$-ethynyl-$17\beta$-hydroxy-$9\beta,10\alpha$-androsta-4,6-dien-3-one,
(8) $1\beta,2\beta$-epoxy-$17\alpha$-ethynyl-$17\beta$-hydroxy-$9\beta,10\alpha$-androst-4-en-3-one,
(9) $1\beta,2\beta$-epoxy-$17\alpha$-vinyl-$17\beta$-hydroxy-$9\beta,10\alpha$-androsta-4,6-dien-3-one,
(10) $1\beta,2\beta$-epoxy-$17\alpha$-(2'-methallyl)-$17\beta$-hydroxy-$9\beta,10\alpha$-androsta-4,6-dien-3-one,
(11) $1\alpha,2\alpha$-epoxy-$17\alpha$-methyl-$17\beta$-hydroxy-$9\beta,10\alpha$-androsta-4,6-dien-3-one.

The compounds of this invention of Formula I above can be prepared by a novel selective epoxidation of $9\beta,10\alpha$-steroids of the formula

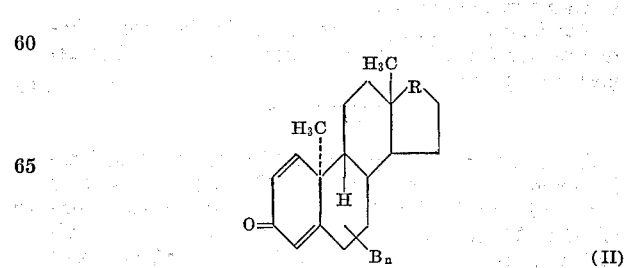

wherein B, $n$ and R have the same meaning as above.

If desired, products of Formula I wherein $n$ is 1 can be selectively hydrogenated to form compounds of Formula I wherein $n$ is 0.

The selective epoxidation is effected using hydrogen peroxide in the presence of alkali. The hydrogen peroxide is suitably used in the form of an aqueous solution, a 30% aqueous solution having been found particularly advantageous. As the alkali there is preferably used an alkali metal hydroxide such as sodium hydroxide or potassium hydroxide.

The epoxidation is suitably carried out in organic solvents such as aromatic or aliphatic hydrocarbons, for example, benzene, toluene, petroleum ether or the like; alcohols, for example, lower alkanols such as methanol, ethanol, or the like; ethers such as dioxan, tetrahydrofuran or the like; ketones such as lower alkanones, for example, acetone or the like, or mixtures of such solvents. The epoxidation is suitably carried out at room temperature or below, preferably at below room temperature, for example, from about $-10°$ C. to about $0°$ C.

The 1,2-epoxy grouping can (as indicated in Formula I by the wavy lines) exhibit $1\alpha,2\alpha$- or $1\beta,2\beta$-configuration, and both groups of compounds are within the ambit of this invention.

The 6(7)-dihydro derivatives, i.e., compounds of Formula I wherein $n$ is 0, can be prepared, not only by selective epoxidation of a 6(7)-dihydro starting material as described above, but also from the 1,2-epoxy-$\Delta^{4,6}$-$9\beta,10\alpha$-steroids of Formula I by hydrogenation. This selective hydrogenation is preferably effected by catalytic hydrogenation with noble metal catalysts such as palladium.

The 1,2-epoxy-$9\beta,10\alpha$-steroids of Formula I are valuable intermediates for the preparation of pharmacologically active 1- and/or 2-substituted $9\beta,10\alpha$-steroids. They can be converted into these latter compounds by reductive or substitutive opening of the epoxy ring (e.g., by treatment with lithium aluminum hydride or with compounds having acidic hydrogen such as hydrogen halides, mercaptans, thio acids, or hydrogen cyanide). Thus, the opening of the epoxide ring can be effected with lithium in liquid ammonia (for example, by the procedure of South African Patent No. 63/5165) or with lithium aluminum hydride. This reductive splitting gives a 1,3-dihydroxy compound. The selective reoxidation of the so-formed 3-hydroxy group to the 3-keto group is then effected by means of manganese dioxide in glacial acetic acid or chloroform. The 1-hydroxy group can then, if desired, be subjected to other reactions whereby other 1-substituents are obtained. The reactions of the 1,2-epoxy-steroids of this invention to yield 1-substituted steroids, and the utilities of such 1-substituted steroids, are described in more detail in our application Ser. No. 565,110, filed July 14, 1966 entitled "$9\beta,10\alpha$-Steroids" filed of even date herewith now United States Patent No. 3,409,642, issued Nov. 5, 1968. In analogy to the methods described in the aforesaid copending application regarding the conversion of 1,2-epoxy-steroids of the $9\beta,10\alpha$-androstane series, 1,2-epoxy-steroids of the $9\beta,10\alpha$-pregnane series can be converted into 1-substituted steroids of the $9\beta,10\alpha$-pregnane series. The latter compounds are likewise useful by virtue of their hormonal or antihormonal activity.

The following examples are illustrative but not limitative of this invention. All temperatures are stated in degrees centigrade.

EXAMPLE 1

A mixture of 10.0 g. of $9\beta,10\alpha$-pregna-1,4,6-triene-3,20-dione, 200 ml. of methanol, 10 ml. of 10% caustic soda and 20 ml. of 30% hydrogen peroxide was maintained at $25°$ for 18 hours. The mixture was then neutralized with 14.5 ml. of acetic acid, poured on ice-water and extracted with methylene chloride. The methylene chloride extracts (washed neutral with water) were dried with sodium sulfate and the solvent evaporated in vacuo. The resultant residue was then chromatographed on silica gel. The ether/petroleum ether (1:1) eluates, pure according to thin layer chromatogram, were combined and recrystallized from methylene chloride/isopropyl ether yielding $1\beta,2\beta$-epoxy-$9\beta,10\alpha$-pregna-4,6-diene-3,20-dione melting at $151-152°$; $[\alpha]_D^{25°} = -613°$ (dioxane). UV: $\lambda_{max.}$ 293 m$\mu$/$\epsilon$=20,500.

EXAMPLE 2

A mixture of 1.0 g. of $9\beta,10\alpha$-pregna-1,4-diene-3,20-dione, 20 ml. of methanol, 4 ml. of 30% hydrogen peroxide and 5 ml. of 1 N methanolic caustic potash was maintained at $25°$ for 16 hours. The mixture was then worked up in accordance with the procedure described in Example 1 and chromatographed on silica gel yielding $1\beta,2\beta$-epoxy-$9\beta,10\alpha$-pregn-4-ene-3,20-dione, melting point $158-160°$. $[\alpha]_D^{25°} = -163°$. UV: $\lambda_{max.}$246 m$\mu$/$\epsilon$=13,700.

EXAMPLE 3

1.0 g. of $1\beta,2\beta$-epoxy-$9\beta,10\alpha$-pregna-4,6-diene-3,20-dione was dissolved in 30 ml. of toluene, and, after the addition of 300 mg. of palladium/calcium carbonate catalyst, hydrogenated at normal pressure. After the uptake of 100 ml. of hydrogen, the catalyst was filtered off and the filtrate evaporated to dryness. The so-obtained residue was recrystallized from methylene chloride/ether yielding $1\beta,2\beta$-epoxy-$9\beta,10\alpha$-pregn-4-ene-3,20-dione which was identical with the compound obtained in accordance with Example 2.

EXAMPLE 4

A solution of 1.0 g. of $17\alpha$-methyl-$17\beta$-hydroxy-$9\beta,10\alpha$-androsta-1,4,6-trien-3-one in 20 ml. of methanol was treated at $0°$ with 1 ml. of 10% caustic soda and 2 ml. of 30% hydrogen peroxide and then maintained at $0°$ for 3 hours. The mixture was then worked up in accordance with the procedure described in Example 1 yielding 1.05 g. of crude product which upon crystallization from methylene chloride/isopropyl ether yielded purified $1\beta,2\beta$-epoxy-$17\alpha$-methyl-$17\beta$-hydroxy-$9\beta,10\alpha$-androsta-4,6-dien-3-one, melting point $160°$ $[\alpha]_D^{25°} = -760°$. UV: $\lambda_{max.}$ 293 m$\mu$/$\epsilon$=20,000.

EXAMPLE 5

According to the method described in Example 4, from 1.0 g. of $17\beta$-hydroxy-$9\beta,10\alpha$-androsta-1,4,6-dien-3-one there was obtained $1\beta,2\beta$-epoxy-$17\beta$-hydroxy-$9\beta,10\alpha$-androsta-4,6-dien-3-one of melting point $155-156°$. UV: $\lambda_{max.}$ 293 m$\mu$/$\epsilon$=20,500. $[\alpha]_D^{25°} = -780°$. The starting material was obtained as follows:

A solution of 15.0 g. of $17\beta$-hydroxy-$9\beta,10\alpha$-androsta-4,6-dien-3-one and 15.0 g. of 2,3-dichloro-5,6-dicyano-benzoquinone in 350 ml. of dioxane which contained 2% of hydrochloric acid gas was stirred at room temperature for 4 hours. 2.0 g. of sodium bicarbonate was then added to the mixture and the whole mixture was then filtered through 300 g. of aluminum oxide. It was eluted with ether/acetic ester (1:1). The eluates were evaporated to dryness and recrystallized from methylene chloride/isopropyl ether yielding $17\beta$-hydroxy-$9\beta,10\alpha$-androsta-1,4,6-trien-3-one; melting point $140°$.

UV: $\lambda_{max.}$ 220 m$\mu$/$\epsilon$=15,000
252 m$\mu$/$\epsilon$=10,300
301 m$\mu$/$\epsilon$=13,000

EXAMPLE 6

According to the procedure described in Example 4, there was obtained from $9\beta,10\alpha$-androsta-1,4,6-triene-3,17-dione the compound $1\beta,2\beta$-epoxy-$9\beta,10\alpha$-androsta-4,6-diene-3,17-dione, which melted at $230-232°$, $[\alpha]_D^{25°} = -698°$. UV: $\lambda_{max.}$ 291 m$\mu$/$\epsilon$=21,650.

What is claimed is:
1. A compound of the formula

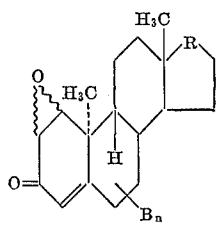

wherein B is an additional unsaturation between the 6- or 7-position and $n$ is a whole integer from 0 to 1; R is

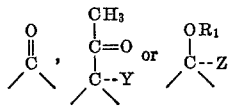

$R_1$ is hydrogen or a substituent containing from 1 to 10 carbon atoms selected from the group consisting of alkyl, alkanoyl, ar-alkanoyl or aroyl; Y is hydrogen, hydroxy, or a substituent containing from 1 to 10 carbon atoms selected from the group consisting of alkanoyloxy, ar-alkanoyloxy or aroyloxy; and Z is hydrogen, lower alkyl, lower alkenyl or lower alkynyl.

2. A compound as in claim 1 wherein R is an acetyl-methylene moiety.

3. A compound as in claim 1 wherein R is a β-hydroxy-methylene moiety.

4. A compound as in claim 1 wherein R is a carbonyl moiety.

5. A compound as in claim 1 which is 1β,2β-epoxy-9β,10α-pregna-4,6-diene-3,20-dione.

6. A compound as in claim 1 which is 1β,2β-epoxy-9β,10α-pregn-4-ene-3,20-dione.

7. A compound as in claim 1 which is 1β,2β-epoxy-17α-methyl-17β-hydroxy-9β,10α-androsta-4,6-diene-3-one.

8. A compound as in claim 1 which is 1β,2β-epoxy-17β-hydroxy-9β,10α-androsta-4,6-diene-3-one.

9. A process for the preparation of a compound of claim 1 which comprises treating a compound of the formula

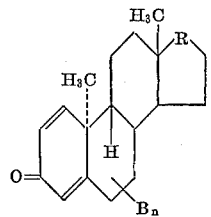

wherein R, B and $n$ have the same meaning as in claim 1 above with hydrogen peroxide in the presence of an alkali metal hydroxide and thereby effecting selective epoxidation of the 1-double bond.

References Cited

Pelc et al., Coll'n Czech. Chem. Commun., vol. 31, 1966, pp. 1363–70.

LEWIS GOTTS, Primary Examiner

E. G. LOVE, Assistant Examiner

U.S. Cl. X.R.

260—999